United States Patent
Miyano et al.

(10) Patent No.: US 7,170,058 B2
(45) Date of Patent: Jan. 30, 2007

(54) DEVICE FOR ASSISTING A PERSON IN RESCUE OPERATIONS UNDER HAZARDOUS SITUATIONS

(75) Inventors: Naoki Miyano, Osaka (JP); Fumio Ishibashi, Higashiosaka (JP); Yoshihisa Ishiba, Higashiosaka (JP); Noboru Kawanishi, Higashiosaka (JP); Takeshi Takata, Higashiosaka (JP); Eiji Shimizu, Takatsuki (JP); Hideya Takahashi, Kashiwara (JP)

(73) Assignees: Sharp Corporation, Osaka (JP); Yamamoto Kogaku Co., Ltd., Osaka (JP)

( * ) Notice: Subject to any disclaimer, the term of this patent is extended or adjusted under 35 U.S.C. 154(b) by 37 days.

(21) Appl. No.: 10/777,822

(22) Filed: Feb. 11, 2004

(65) Prior Publication Data

US 2005/0167590 A1 Aug. 4, 2005

(30) Foreign Application Priority Data

Feb. 12, 2003 (JP) ............................. 2003-034285

(51) Int. Cl.
*H01L 31/00* (2006.01)
(52) U.S. Cl. ..................................... 250/330; 359/356
(58) Field of Classification Search ................ 250/330, 250/38.1, 342, 349, 350, 353, 338.3, 338.1; 359/350, 356
See application file for complete search history.

(56) References Cited

U.S. PATENT DOCUMENTS

| | | | | |
|---|---|---|---|---|
| 4,449,787 A | * | 5/1984 | Burbo et al. ................. | 313/524 |
| 4,996,981 A | * | 3/1991 | Elenewski et al. ...... | 128/201.15 |
| 5,089,914 A | * | 2/1992 | Prescott ....................... | 359/815 |
| 5,604,346 A | * | 2/1997 | Hamrelius et al. ........ | 250/252.1 |
| 5,805,120 A | * | 9/1998 | Yamada et al. ................ | 345/7 |
| 5,838,489 A | * | 11/1998 | Erdmann ..................... | 359/357 |
| 5,949,582 A | * | 9/1999 | Coombs ..................... | 359/630 |
| 6,023,061 A | * | 2/2000 | Bodkin ....................... | 250/332 |
| 6,023,288 A | * | 2/2000 | Coombs et al. ............... | 348/64 |
| 6,476,391 B1 | * | 11/2002 | Zhang ......................... | 250/330 |
| 6,560,029 B1 | * | 5/2003 | Dobbie et al. .............. | 359/631 |
| 6,606,114 B1 | * | 8/2003 | Gordon et al. ................ | 348/64 |
| 6,720,878 B2 | * | 4/2004 | Jumpertz .................. | 340/573.1 |
| 2002/0030163 A1 | * | 3/2002 | Zhang ....................... | 250/330 |

FOREIGN PATENT DOCUMENTS

JP 5-75892 10/1993

* cited by examiner

*Primary Examiner*—David Porta
*Assistant Examiner*—Faye Boosalis
(74) *Attorney, Agent, or Firm*—Koda & Androlia

(57) ABSTRACT

An abnormality detection support device, suitable for a case where rescue operations are made under situations that visibility is disturbed by smoke due to fire, includes an infrared camera, a display which, at least when the infrared camera is in use, comes to be positioned in front of a user's eyes and reproduces an image taken by the infrared camera thereon and a face protector or a helmet, on which the infrared camera and the display are provided, and the infrared camera and the display are arranged to be within an outline of the user's head in a front view when the device is put on the user. The present invention can, therefore, provide the abnormality detection support device which enables an operator to work with both hands available while directly watching the infrared image even under a circumstance that smoke or the like due to occurrence of fire disturbs the field of vision of the operator, and has excellent usability.

19 Claims, 15 Drawing Sheets

Arrangement of camera and eye
(when viewed from the top)

DEVICE FOR ASSISTING A PERSON IN RESCUE OPERATIONS UNDER HAZARDOUS SITUATIONS

BACKGROUND OF THE INVENTION

1. Field of the Invention

The invention relates to an abnormality detection support device which is suitable for a case where rescue operations or the like are made under situations that visibility is disturbed by smoke or the like due to fire.

2. Description of the Related Art

Such a kind of an abnormality detection support device includes a helmet, an infrared camera, a display, and a radio transmitter as disclosed in Japanese Utility Model Application Laid-Open (Kokai) No. 5-75892 (Oct. 15, 1993). The infrared camera is fixed to an outer peripheral surface of the helmet. The display is attached to the helmet so that an image screen comes to the front of a head of a user wearing the helmet, and reproduces an image taken by the infrared camera. The radio transmitter is attached to the helmet and radio-transmits an image signal of the infrared camera to a radio receiver provided in a remote location.

When the abnormality detection support device is used, a field operator wearing the helmet directly watches an infrared image and simultaneously can work with both hands available under a situation that smoke or the like due to fire disturbs the field of vision of the operator. Further, when the image taken with infrared is radio-transmitted to the radio receiver provided in a place separated from the field, more precise monitoring, diagnosis of the circumstances and the like can be made.

The abnormality detection support device, however, has the following problems (1) to (3):

(1) since the infrared camera is fixed so as to project laterally from the outer peripheral surface of the helmet, when the operator passes through a narrow place, the infrared camera is in danger of bumping against obstacles and being damaged;

(2) since the infrared camera is set in a position which is fairly higher than positions of the ears on temporal region of the user, there are so much of differences between an actual image the user sees with the naked eye and an image on the display taken by the infrared camera; and (3) since the infrared camera is fixed so as to project laterally from the outer peripheral surface of the helmet, the left and the right sides of the helmet is not well balanced in weight, and thus the user's neck is strained.

That is to say, this abnormality detection support device has unsatisfactory usability as explained in (1) to (3).

It is, therefore, an object of the present invention to provide an abnormality detection support device which enables an operator to work with both hands available while directly watching an infrared image even under a circumstance that smoke or the like due to occurrence of fire disturbs the field of vision of the operator, and has excellent usability.

SUMMARY OF THE INVENTION

An abnormality detection support device of the present invention includes an infrared camera, a display which, at least when the infrared camera is in use, comes to be positioned in front of a user's eyes and reproduces an image taken by the infrared camera thereon, and a face protector or a helmet, on which the infrared camera and the display are provided. The infrared camera and the display are arranged to be within an outline of the user's head in the front view when the device is put on the user.

In the abnormality detection support device of the present invention, since the infrared camera and the display are arranged to be within the outline of the user's head in the front view when the device is put on the user, the infrared camera is unlikely to bump against obstacles and is damaged when the user passes through a narrow place.

An abnormality detection support device of the present invention includes an infrared camera, a display which, at least when the infrared camera is in use, comes to be positioned in front of a user's eyes and reproduces an image taken by the infrared camera thereon, and a face protector or a helmet, on which the infrared camera and the display are provided. The infrared camera is arranged on a line extending through the user's left and right eyes and near one of the eyes.

In the abnormality detection support device of the present invention, since the infrared camera is arranged on the line extending through the user's left and right eyes and near one of the eyes, an image on the display taken by the infrared camera is not greatly different from an actual image the user sees with the naked eye.

An abnormality detection support device of the present invention includes an infrared camera, a display which, at least when the infrared camera is in use, comes to be positioned in front of a user's eyes and reproduces an image taken by the infrared camera thereon, and a face protector or a helmet, on which the infrared camera and the display are provided. The infrared camera is arranged so that a center of gravity is put over a virtual center line.

In the abnormality detection support device of the present invention, since the infrared camera is arranged so that a center of gravity is put over a virtual center line, the right and the left sides of the device are well balanced in weight, and thus strain on the user's neck is small.

An abnormality detection support device of the present invention includes an infrared camera, a display which, at least when the infrared camera is in use, comes to be positioned in front of a user's eyes and reproduces an image taken by the infrared camera thereon, and a face protector or a helmet, on which the infrared camera and the display are provided. The infrared camera is arranged in a position near a jaw portion of the user.

In the abnormality detection support device of the present invention, since the infrared camera is arranged in the position near the jaw portion of the user, moment on the user's neck is small, and thus the strain on the user's neck is small.

An abnormality detection support device of the present invention includes an infrared camera, a display which, at least when the infrared camera is in use, comes to be positioned in front of a user's eyes and reproduces an image taken by the infrared camera thereon, and a face protector or a helmet, on which the infrared camera and the display are provided. The infrared camera is arranged in a position separated from the display in the front view, and the image taken by the infrared camera is reproduced on the display in a position in front of the user's eyes by optical or electrical coordinate conversion.

In the abnormality detection support device of the present invention, since the infrared camera is arranged in the position separated from the display in the front view, and the image taken by the infrared camera is reproduced on the display in the position in front of the user's eyes by optical or electrical coordinate conversion, an image on the display taken by the infrared camera is not greatly different from an actual image the user sees with the naked eye.

In the abnormality detection support device of the present invention, the display is of a monocular type.

In the abnormality detection support device of the present invention, since the display is of the monocular type, the user can always grasp ambient situation through one eye, and thus the user can appropriately respond to unforeseen contingencies so that the safety of the user is improved.

In the abnormality detection support device of the present invention, the face protector or the helmet is equipped with a radio data transmission device for radio-transmitting an image signal of the infrared camera to a radio receiver which is provided in a remote location.

In the abnormality detection support device of the present invention, the image taken by the infrared camera is radio-transmitted to the radio receiver provided in a location separated from a field, so that more admissible observation and judgment of the situation can be made.

In the abnormality detection support device of the present invention, the infrared camera is detachable from the face protector or the helmet.

In the abnormality detection support device of the present invention, since the infrared camera is detachable from the face protector or the helmet, the strain on the user's neck due to the weight of the infrared camera can be suppressed at the time of the detachment of the infrared camera. Meanwhile, the infrared camera as a portable camera can photograph the inside of a small hole or the like which is smaller than the size of the abnormality detection support device as an entire system.

In the abnormality detection support device of the present invention, the infrared camera can be attached to or detached from the face protector or the helmet with the user' simple operation.

In the abnormality detection support device of the present invention, since the infrared camera can be attached to or detached from the face protector or the helmet with the user' simple operation, the camera attachment/detachment operation can be performed for a short time.

In the abnormality detection support device of the present invention, the display can be moved to another position so as to be out of the user's view when the display is not in use.

In the abnormality detection support device of the present invention, since the display can be moved to another position so as to be out of the user's view when the display is not in use, the user can easily grasp the situation through both his/her eyes.

In the abnormality detection support device of the present invention, the infrared camera and the display are arranged on the same side with respect to a virtual center line which divides the front of the head of the user into right and left portions.

In the abnormality detection support device of the present invention, since the infrared camera and the display are arranged on the same side with respect to a virtual center line which divides the front of the head of the user into right and left portions, the user can have a more factual distance perception and a more real sense of direction by adjusting the monocular display to the direction the infrared camera points to.

In the abnormality detection support device of the present invention, the front of the face protector or the helmet is shielded, and inner surface of the shield and the surface of the display are fog-proofed.

In the abnormality detection support device of the present invention, since the front of the face protector or the helmet is shielded, and inner surface of the shield and the surface of the display are fog-proofed, lack of the visibility in front due to the front surface being fogged can be eliminated, and the safety of the operations can be secured.

The abnormality detection support device of the present invention is provided with an adjustment mechanism for adjusting a position and an angle of the display.

In the abnormality detection support device of the present invention, since the adjustment mechanism for adjusting the position and the angle of the display is provided, the user can adjust the display to the most suitable position in front of the user' eyes.

The abnormality detection support device of the present invention can receive radio data from a remote location.

In the abnormality detection support device of the present invention, since the device can receive radio data from the remote location, the user can receive an admissible instruction from a location separated from the field.

In the abnormality detection support device of the present invention, the infrared camera, the display and the radio data transmission device are installed inside the face protector or the helmet.

In the abnormality detection support device of the present invention, since the display and the radio data transmission device are installed inside the face protector or the helmet, these equipments can get better heat-resistance and water-resistance compared to the case where the equipments are exposed.

In the abnormality detection support device of the present invention, at least one of a camera control device, a radio data transmission device and a battery is provided to the face protector or the helmet, and at least one of the camera control device, the radio data transmission device and the battery, and the infrared camera are arranged so that a center of gravity is put over the virtual center line of the face protector or the helmet.

In the abnormality detection support device of the present invention, since at least one of the camera control device, the radio data transmission device and the battery, and the infrared camera are arranged so that a center of gravity is put over the virtual center line of the face protector or the helmet, the right and the left sides of the device are well balanced in weight, and thus strain on the user's neck is small.

DESCRIPTION OF THE PREFERRED EMBODIMENTS

An abnormality detection support device according to embodiments of the invention is explained below with reference to the drawings.

First Embodiment

Figure 1:
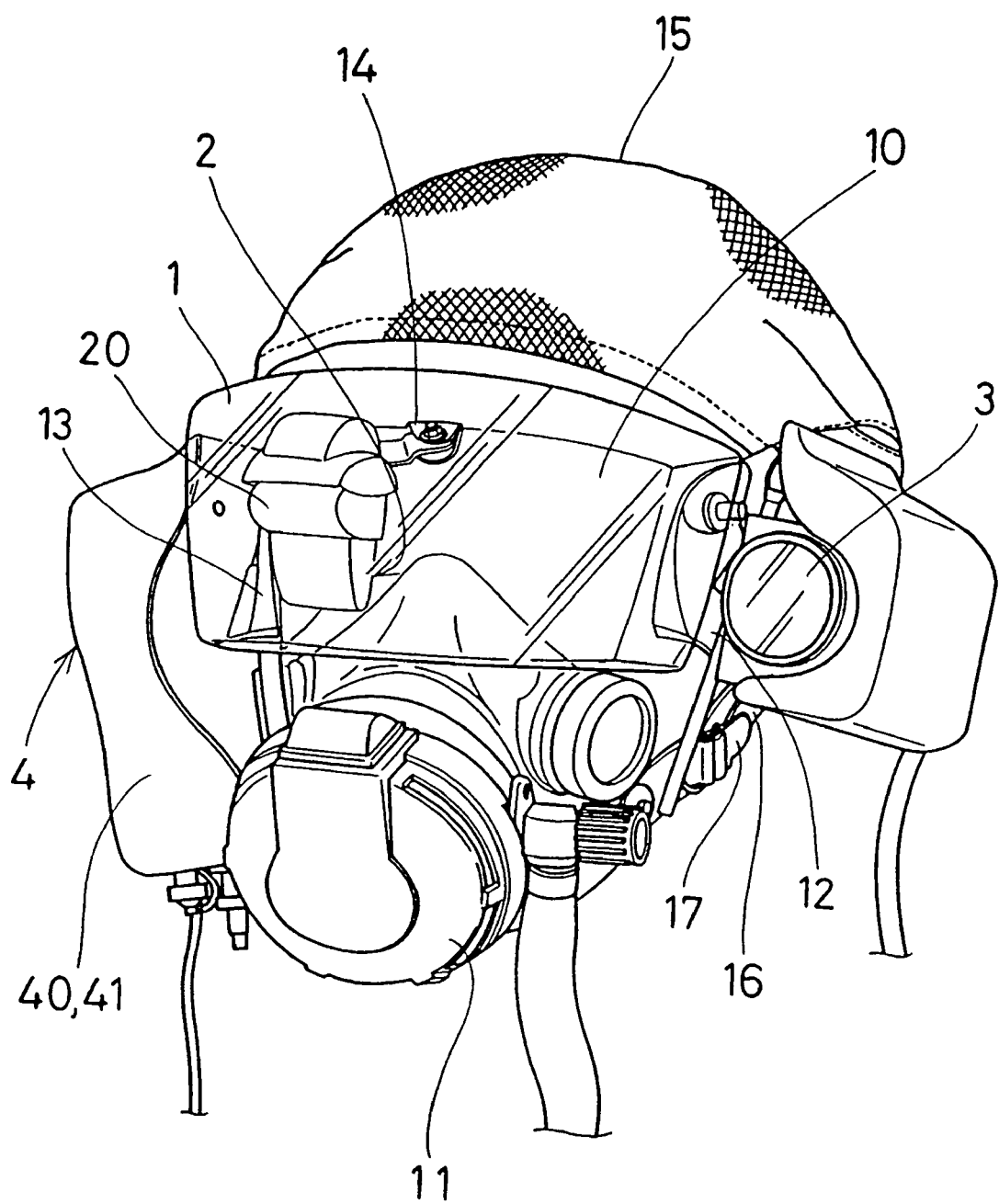
FIG. 1 is a perspective view illustrating an abnormality detection support device according to a first embodiment of the present invention.
Figure 2:
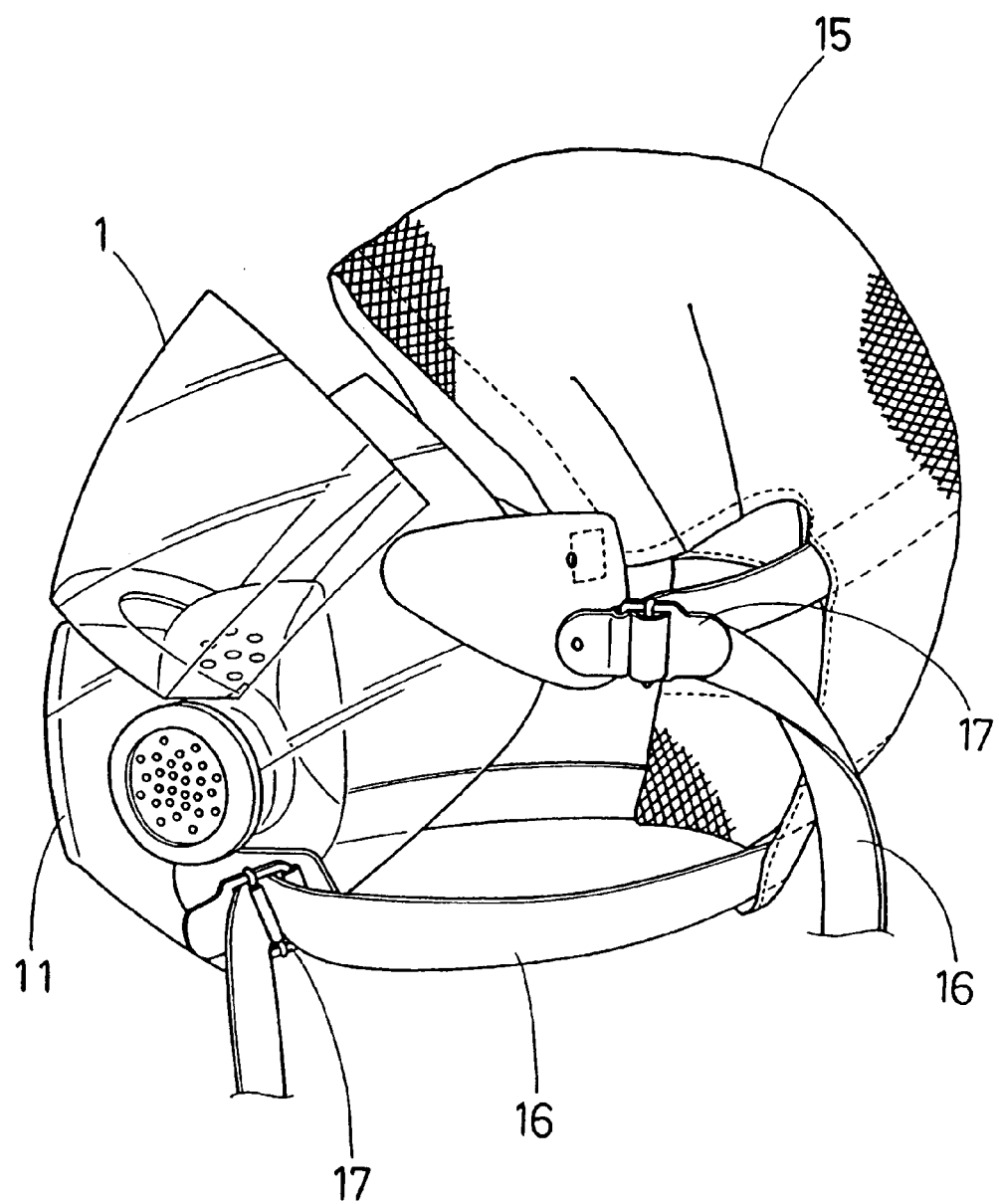
FIG. 2 is a side view of the abnormality detection support device accordion to the first embodiment.

FIG. 1 is a perspective view illustrating the abnormality detection support device according to the first embodiment of the present invention, and FIG. 2 is a side view of the abnormality detection support device.

(Basic Structure of the Abnormality Detection Support Device)

The abnormality detection support device basically, as shown in FIG. 1, includes a fire face piece 1, a monocular display 2 provided in the fire face piece 1, an infrared camera 3 attached to the left side of the fire face piece 1 near the left eye of a user, and an electronic parts unit 4 attached to the right side of the fire face piece 1 near the right eye of the user.

(The Fire Face Piece 1)

The fire face piece 1 is made of transparent synthetic resin, and as shown in FIG. 1, a void portion 10 for housing the display 2 is provided to its upper portion, and a mask 11 for supplying air is provided to its lower portion. The user can wear the fire face piece 1 in a sealed state via an elastic member which is stuck to a peripheral portion on an inner surface of the fire face piece 1.

As shown in FIG. 1, a bracket 12 for attaching the infrared camera 3 to the left side of the fire face piece 1, a bracket 13 for attaching the electronic parts unit 4 to the right side of the fire face piece 1, a bracket 14 for attaching the display 2 to the top portion of the fire face piece 1 are respectively provided.

As shown in FIGS. 1 and 2, the fire face piece 1 is also provided with a net type hat piece 15 on its rear side. A stop bind 16 provided to the hat piece 15 is fastened through a holdfast 17 provided to the fire face piece 1, so that the user can put on the fire face piece 1 tightly without leaving space between the fire face piece 1 and the face of the user.

(The Display 2)

As shown in FIG. 1, the display 2 is of a monocular type, and is arranged near the right eye of the user via the bracket 14. In this embodiment, as shown in FIG. 1, the display 2 is attached via a support 20, and the display 2 can move forward, horizontally and vertically, namely, three-dimensionally with respect to the support 20 by a screw mechanism so that the display 2 is adjusted to a position in front of the user' eyes. The display 2 may be moved with respect to the support 20 manually or by utilizing a rotational force of a motor or the like.

The display 2 is of a see-through type so as to be capable of transmitting about 20% of external light when not in use.

(The Infrared Camera 3)

The infrared camera 3 is attached to the left side of the fire face piece 1 as mentioned above, and more concretely, the infrared camera 3 is arranged on a line extending through the user's left and right eyes and near the left eye. Therefore, an image on the display taken by the infrared camera is not greatly different from an actual image the user sees with the naked eye.

The infrared camera 3 makes it possible for the user to work even under a circumstance that smoke or the like due to the occurrence of fire disturbs the visibility of field operators by directly watching the infrared image.

(The Electronic Parts Unit 4)

The electronic parts unit 4 has a camera control device 40, and a radio data transmission device 41 for radio-transmitting an image signal of the infrared camera to a radio receiver provided in a remote location. A battery is used as their driving power.

The electronic parts unit 4 is attached to the right side of the fire face piece 1 near the right eye of the user, so that a moment which is generated by a weight of the electronic parts unit 4 balances out a moment which is generated by a weight of the infrared camera 3 as much as possible.

(Excellent Functions and Effects of the Abnormality Detection Support Device)

(1) When the abnormality detection support device is used, the display 2 is moved forward, horizontally and vertically, namely, three-dimensionally by the screw mechanism with respect to the support 20, so that the display 2 can be adjusted to the position in front of the user' eye. After being adjusted, the user wears the hat piece 15 and fastens the stop bind 16 provided to the hat piece 15 through the holdfast 17 provided to the fire face piece 1, so that the user can put on the fire face piece 1 tightly without leaving space between the fire face piece 1 and the face of the user.

Because of the above-mentioned structure, the user can adjust the position of the image on the display 2 to the level of the user' eyes so as to get better vision and the image on the display 2 is not blurred due to the vibration caused by the user at the time of the operations.

(2) Since the display 2 is of the see-through type and thus can transmit about 20% of the external light when not in use, a composite scene obtained by scenes viewed by one eye and see-through eye is the approximately same as a normal scene. For this reason, the user is not disturbed the operations even when the display 2 is not in use.

(3) Since the infrared camera 3 is arranged on a line extending through the user's left and right eyes, the image on the display 2 is not greatly visually different from the actual image and thus the user can recognize the image on the display 2 properly.

(4) Since the moment generated on the user's neck by the weight of the electronic parts unit 4 and the weight of the infrared camera 3 is balanced out as much as possible, the user can perform the operations without deteriorating maintenance of the posture in a still state and agility in his/her movement and without feeling stress.

(5) Since the electronic parts unit 4 is attached near the right eye of the user, the user can easily operate the electronic parts unit 4 with a simple switch operation, and thus this device is easy to use.

Second Embodiment

Figure 3:
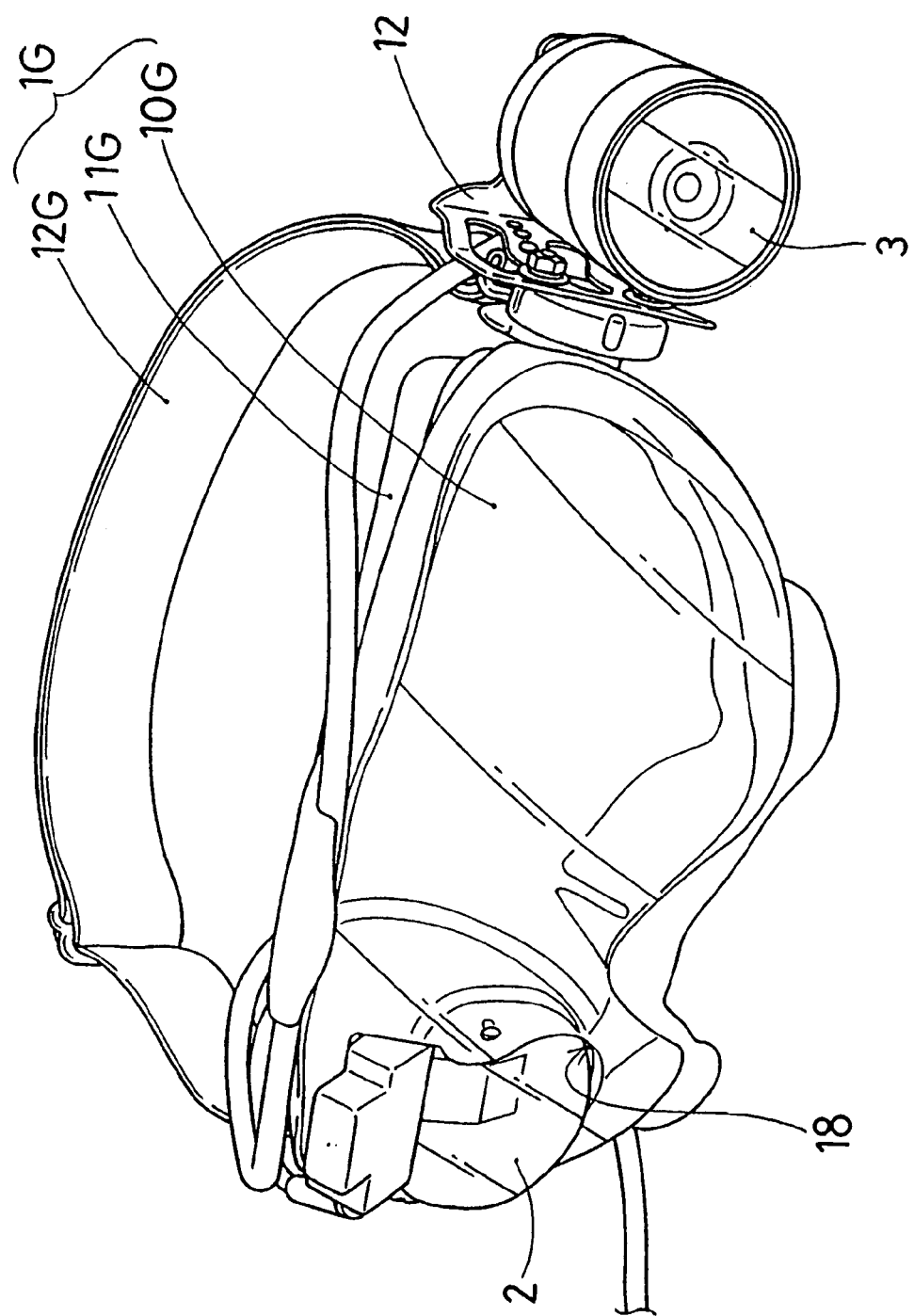
FIG. 3 is a perspective view illustrating a goggle portion of the abnormality detection support device according to a second embodiment of the present invention.
Figure 4:
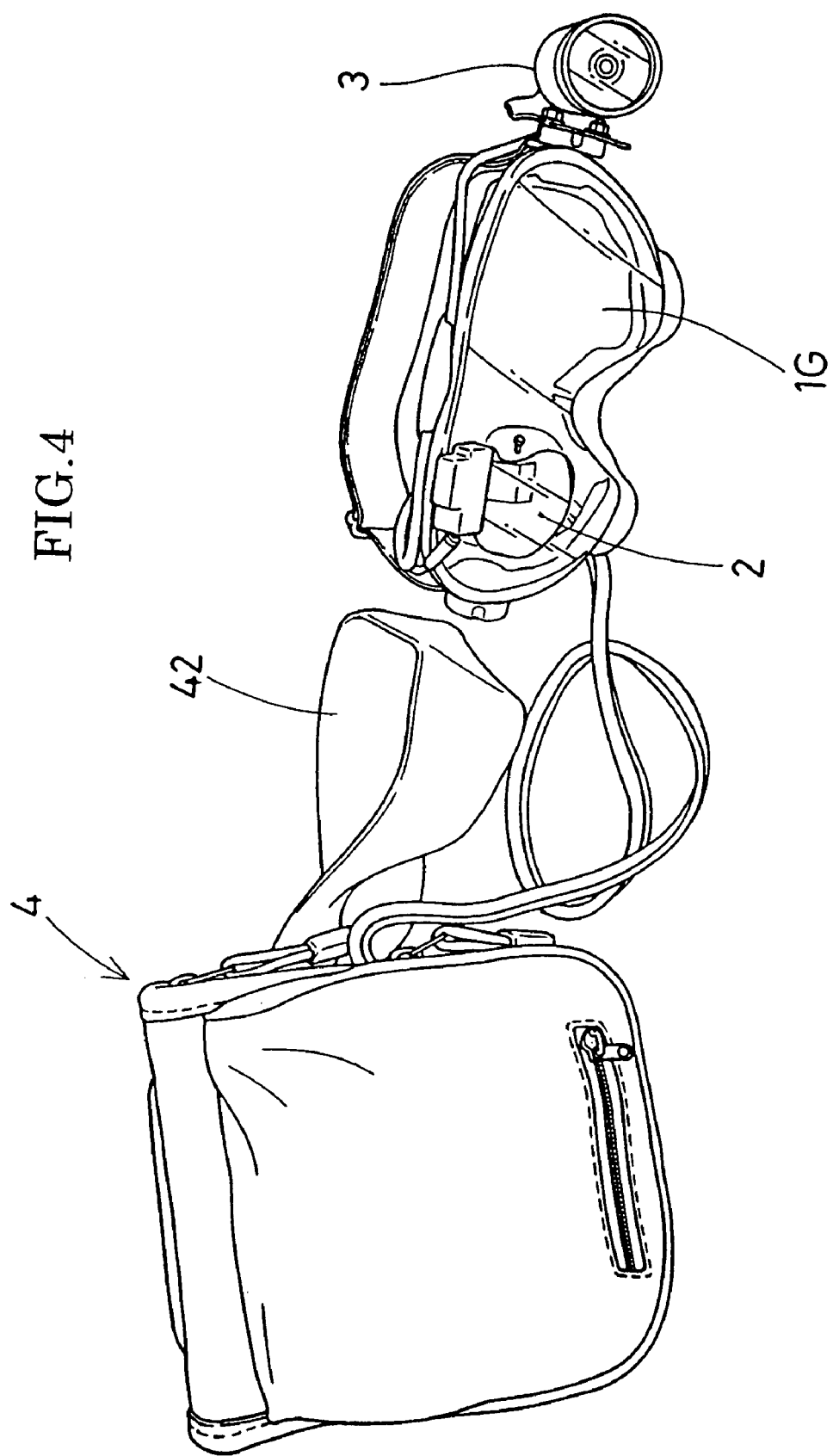
FIG. 4 is an overall view of the abnormality detection support device according to the second embodiment.

FIG. 3 is a perspective view illustrating a goggle portion of the abnormality detection support device according to a second embodiment of the present invention. FIG. 4 is an overall view of the abnormality detection support device.

(The Basic Structure of the Abnormality Detection Support Device)

The abnormality detection support device is used in logistical support for fire fighting. As shown in FIGS. 3 and 4, the device basically includes a goggle 1G, a monocular display 2 arranged so as to occlude a cut portion of a lens portion of the goggle 1G, an infrared camera 3 attached to the left side of the goggle 1G, and an electronic parts unit 4.

(The Goggle 1G)

As shown in FIG. 3, the goggle 1G includes a lens section 10G, an elastic member 11G for fitting the lens portion 10G to the face in a sealed state, and a belt 12G for attaching the lens portion 10G to the face. The goggle 1G can be attached to the face of the user in the sealed state due to the presence of the elastic member 11G.

As shown in FIG. 3, an opposed portion of the lens portion 10G to the left eye of the user is provided with an opening 18 for attaching the monocular display 2.

The goggle 1G is also provided with the bracket 12 for attaching the infrared camera 3 to the left side of the goggle 1G, as shown in FIG. 3.

(The Display 2)

The display 2, as shown in FIG. 3, is arranged so as to occlude the opening 18 in the front view, and the elastic member 11G is provided to occlude a gap between the display 2 and the opening 18. The display 2 is equipped with an HOE lens of about 2 cm$^2$ (generally, it is called as a holographic optical element or hologram combiner), and it is made so as to be moved back and forth for adjusting its position (its position can be adjusted up and down and left and right by moving the goggle itself).

(The Infrared Camera 3)

The infrared camera 3 is a small-size CCD camera which allows a user to see a near-infrared region where ember can be recognized, and it is arranged on a line extending through the user's left and right eyes in the goggle 1G via the bracket 12.

(The Electronic Parts Unit 4)

The electronic parts unit 4 is basically similar to that in the first embodiment, but as shown in FIG. 4, it has a belt 42 for attaching it to a waist of the user.

(The Functions and Effects of the Abnormality Detection Support Device)

The abnormality detection support device produces the following excellent functions and effects:

(1) since the small-size CCD camera is used, the weight of the device is small, and since the electronic parts unit 4 can be attached to the waist of the user by the belt 42, the strain on the user's neck is further reduced in comparison with the device in the first embodiment;

(2) the user can adjust the position of the image on the display 2 to the level of the user' eyes so as to get better vision and the image on the display 2 is not blurred due to the vibration caused by the user at the time of the operations;

(3) since the display 2 is equipped with the HOE lens, the composite scene of the scene viewed by one eye and the scene by see-through eye is the approximately same as the normal scene, and thus the user is not disturbed the operations even when the display 2 is not in use;

(4) the image on the display 2 is not greatly visually different from the actual image and thus the user can recognize the image on the display 2 properly; and (5) the user can easily operate the electronic parts unit 4 with the simple switch operation, and thus this device is easy to use.

Third Embodiment

Figure 5:
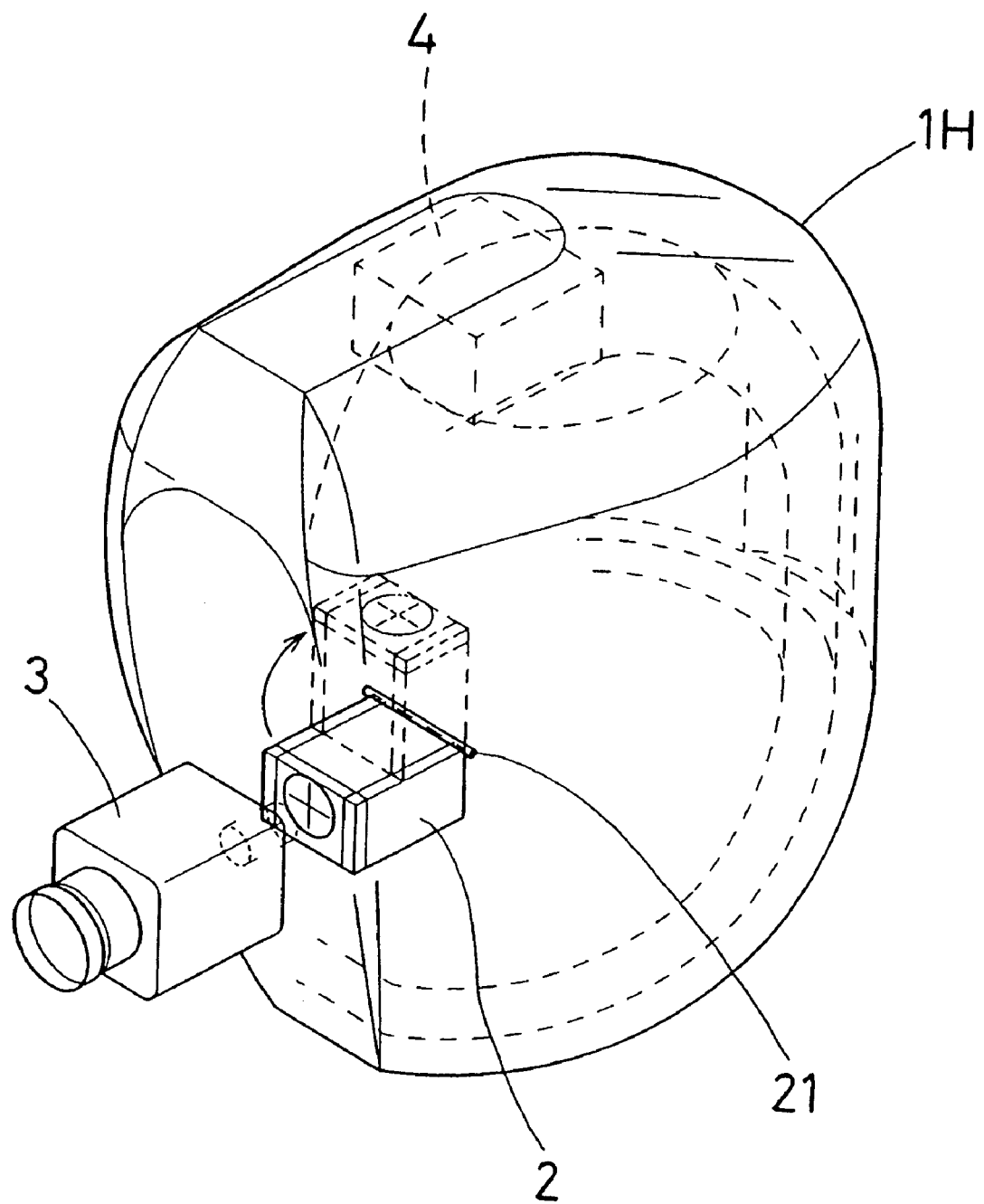
FIG. 5 is a perspective view of the abnormality detection support device according to a third embodiment of the present invention.

FIG. 5 is a perspective view illustrating a helmet-type abnormality detection support device according to a third embodiment of the present invention.

As shown in FIG. 5, the abnormality detection support device includes a helmet 1H, a display 2 arranged in front of the left eye of a user, an infrared camera 3 arranged on the right side of the jaw portion of the user, and an electronic parts unit 4 built in near the top of the helmet 1H. In the helmet 1H, its front portion is covered with a transparent face piece, and a liner is formed on its inner surface.

In the abnormality detection support device, the user can tip up the display 2 on an axis 21 to an upper position where the display 2 is out of the user's sight. The user may be allowed to move the display 2, for example, horizontally along a guide rail in the helmet 1.

Figure 6:
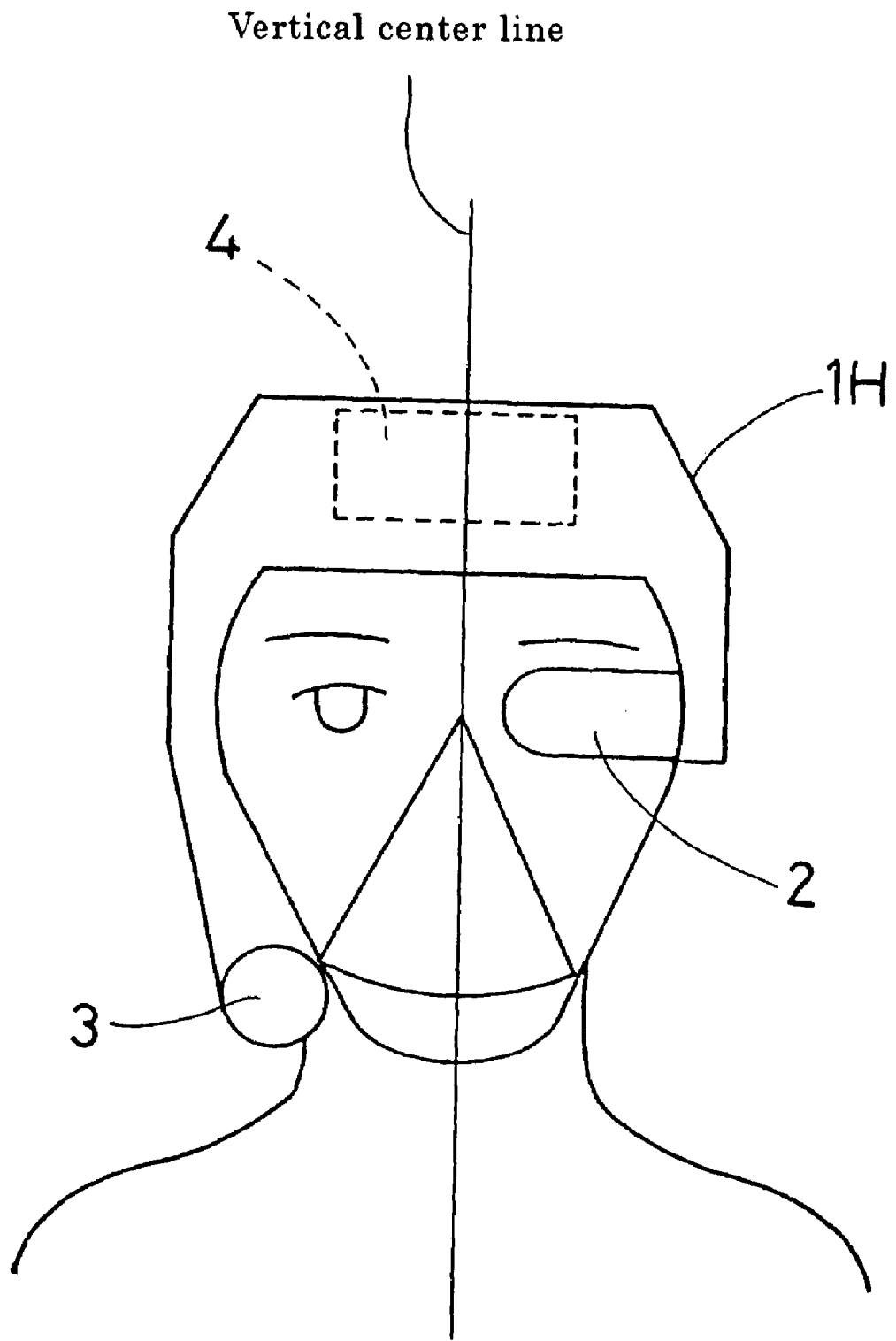
FIG. 6 illustrates the abnormality detection support device according to another embodiment of the present invention.

Other Embodiments (1) As shown in FIG. 6, it is preferable that the infrared camera 3 and the display 2 are arranged within an outline of the helmet 1H in the front view when the helmet 1H is attached to the head of a user. In this embodiment, as shown in FIG. 6, the electronic parts unit 4 may be packaged into the vicinity of the top of the helmet 1H on a virtual center line. In this embodiment, even when the user passes through a narrow place, the infrared camera 3 unlikely bumps against obstacles and gets damaged, and the moment generated on the user's neck becomes small.

Figure 7:
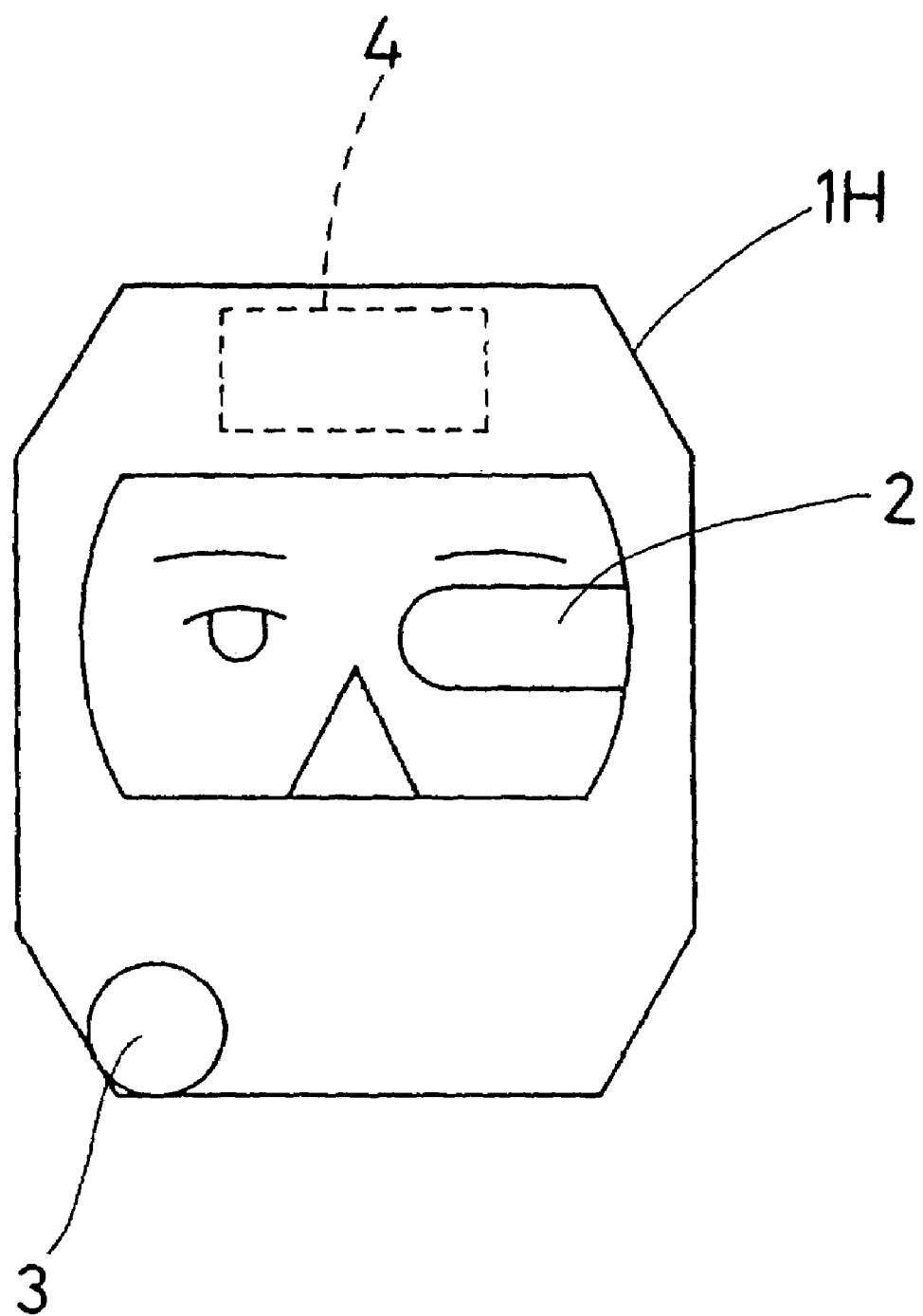
FIG. 7 illustrates the abnormality detection support device according to another embodiment of the present-invention.

(2) As shown in FIG. 7, the display 2, the infrared camera 3, and the electronic parts unit 4 can be installed in the helmet 1H. Also in this case, the similar effect to that in FIG. 6 is produced.

(3) It is preferable that the infrared camera 3 is arranged on the virtual center line (for example, a center of the forehead of a user) which divides the front of the head of the user into right and left portions. In this embodiment, the right and the left sides of the device are well balanced in weight, and thus the strain on the user's neck is small.

(4) As shown in FIG. 6, it is preferable that the infrared camera 3 is arranged near the jaw portion of the user. In this embodiment, the strain on the user's neck can be small.

Figure 8:
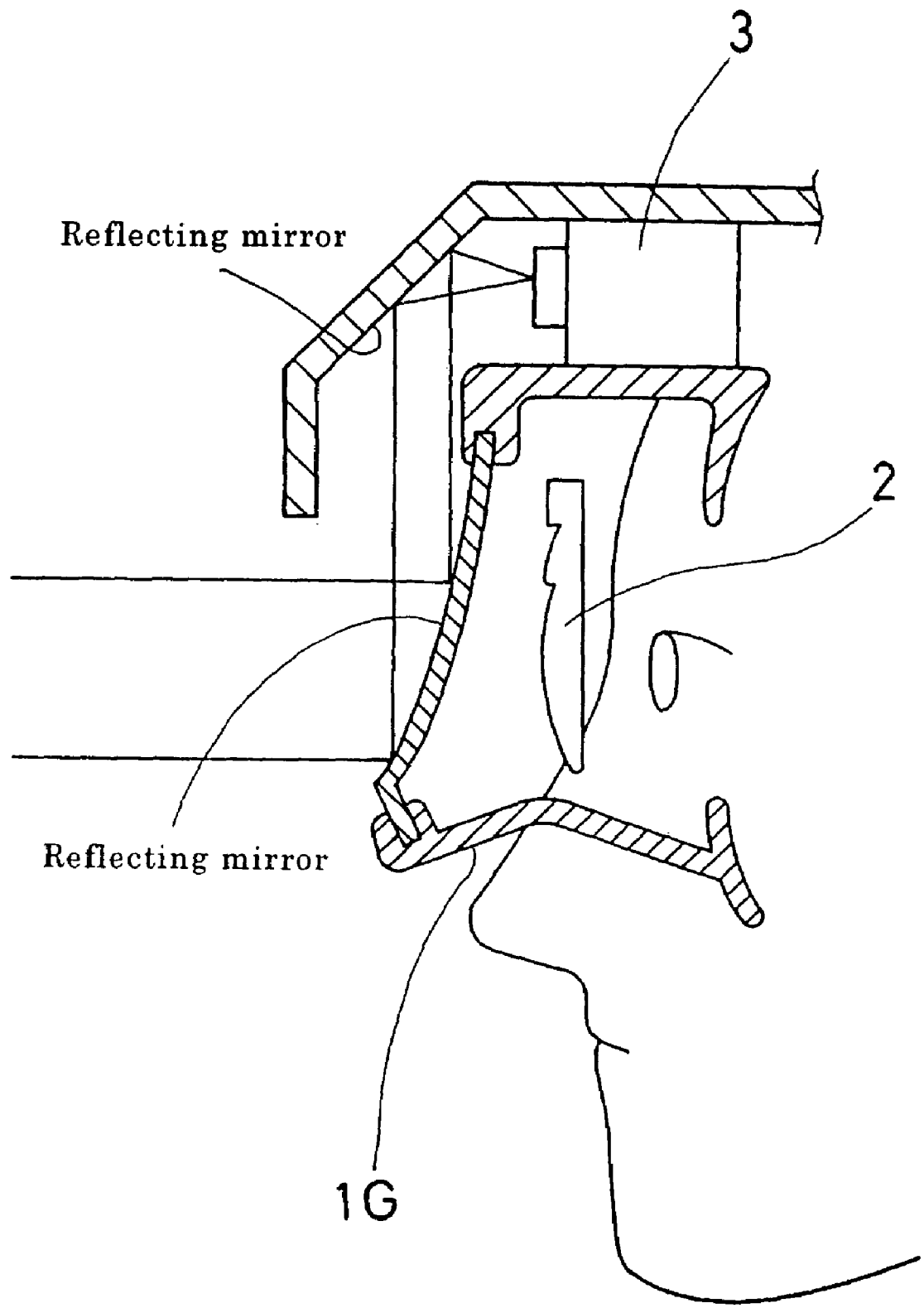
FIG. 8 illustrates the abnormality detection support device according to another embodiment of the present invention in which an image taken by an infrared camera is reproduced on a display in a position in front of a user's eyes by adjusting with an optical method.

(5) As shown in FIG. 8, it is preferable that the infrared camera 3 is arranged in the position separated from the display 2 in the front view, and an image taken by the infrared camera 3 is reproduced on the display 2 in front of the user' eyes by optical (or electrical) coordinate conversion. In this embodiment, the image on the display 2 taken by the infrared camera 3 is not greatly different from the actual image the user sees with the naked eye. As to the electrical coordinate conversion here, when the camera is arranged in the different position from the use's eyes, a pixel (c, d) of the camera is converted into a pixel (x, y) of a display image based on the following coordinate conversion equation (the vertical case is exemplified):

$$y = (b - h) \div [r\tan\phi / (N/2)]$$
$$= \{[r\tan\theta / (N/2)] \times d - h\} \times [(N/2) / r\tan\phi]$$
$$= [(\tan\theta / \tan\phi) \times d] - \{[h \times (N/2)] / r\tan\phi\}$$
$$x = a \div [r\tan\phi' / (M/2)]$$
$$= (\tan\theta' / \tan\phi') \times c$$

Figure 14:
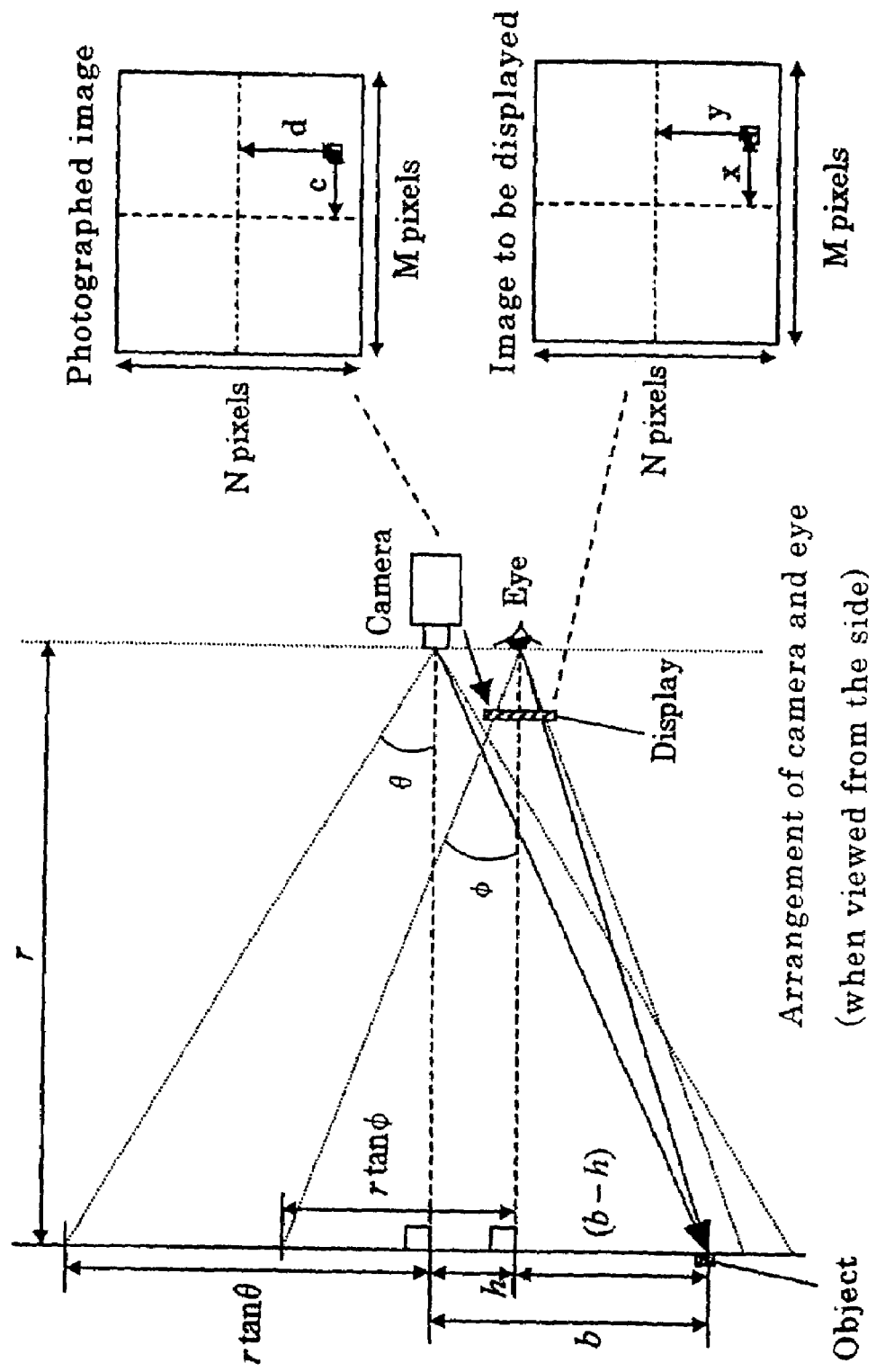
FIG. 14 is a conceptual diagram of electrical coordinate conversion of adjusting an image to a position in front of a user's eyes (in a side view)
Figure 15:
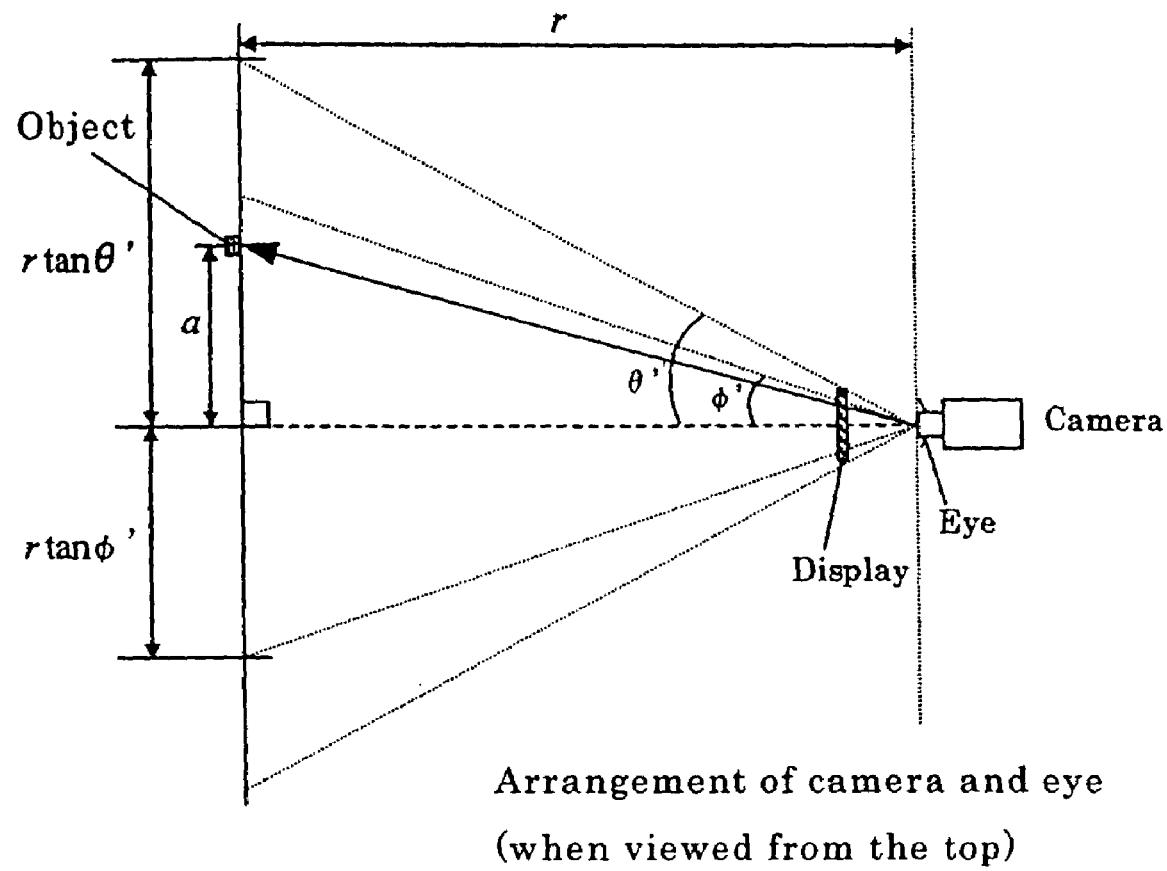
FIG. 15 is a conceptual diagram of the electrical coordinate conversion of adjusting an image to a position in front of a user's eyes (in a top view).

As a result, the camera image is converted into data and electronically enlarged or reduced so as to be trimmed (see FIGS. 14 and 15).

Figure 9:
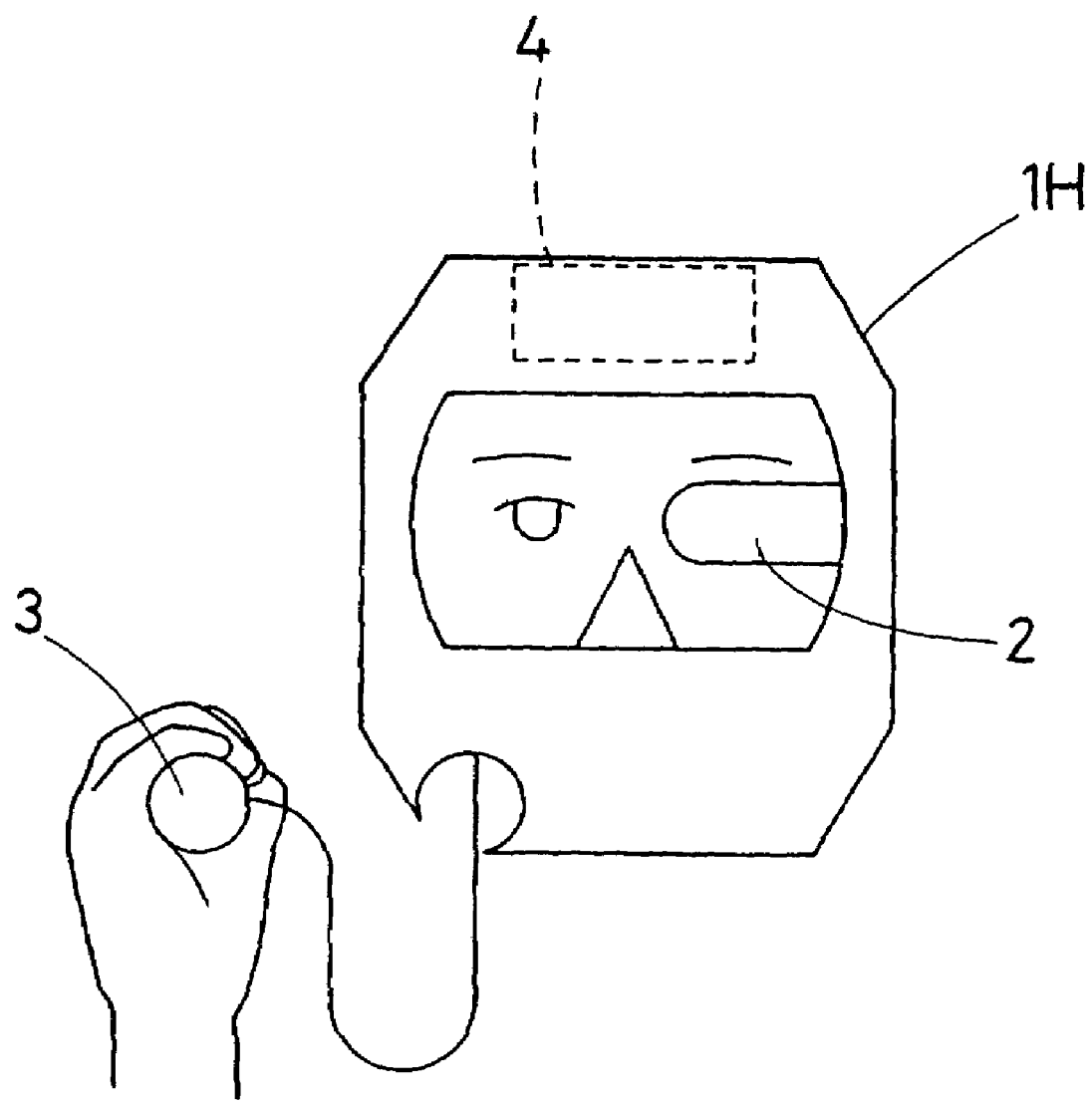
FIG. 9 illustrates the abnormality detection support device according to another embodiment of the present invention.

(6) As shown in FIG. 9, it is preferable that the infrared camera 3 is detachable from the helmet 1H with a user's simple operation. In this embodiment, the strain on the user's neck due to the weight of the infrared camera 3 can be suppressed when it is detached from the helmet 1H, and meanwhile the infrared camera 3 as a portable camera can photograph the inside of a small hole or the like which is smaller than the size of the abnormality detection support device as an entire system.

Figure 10:
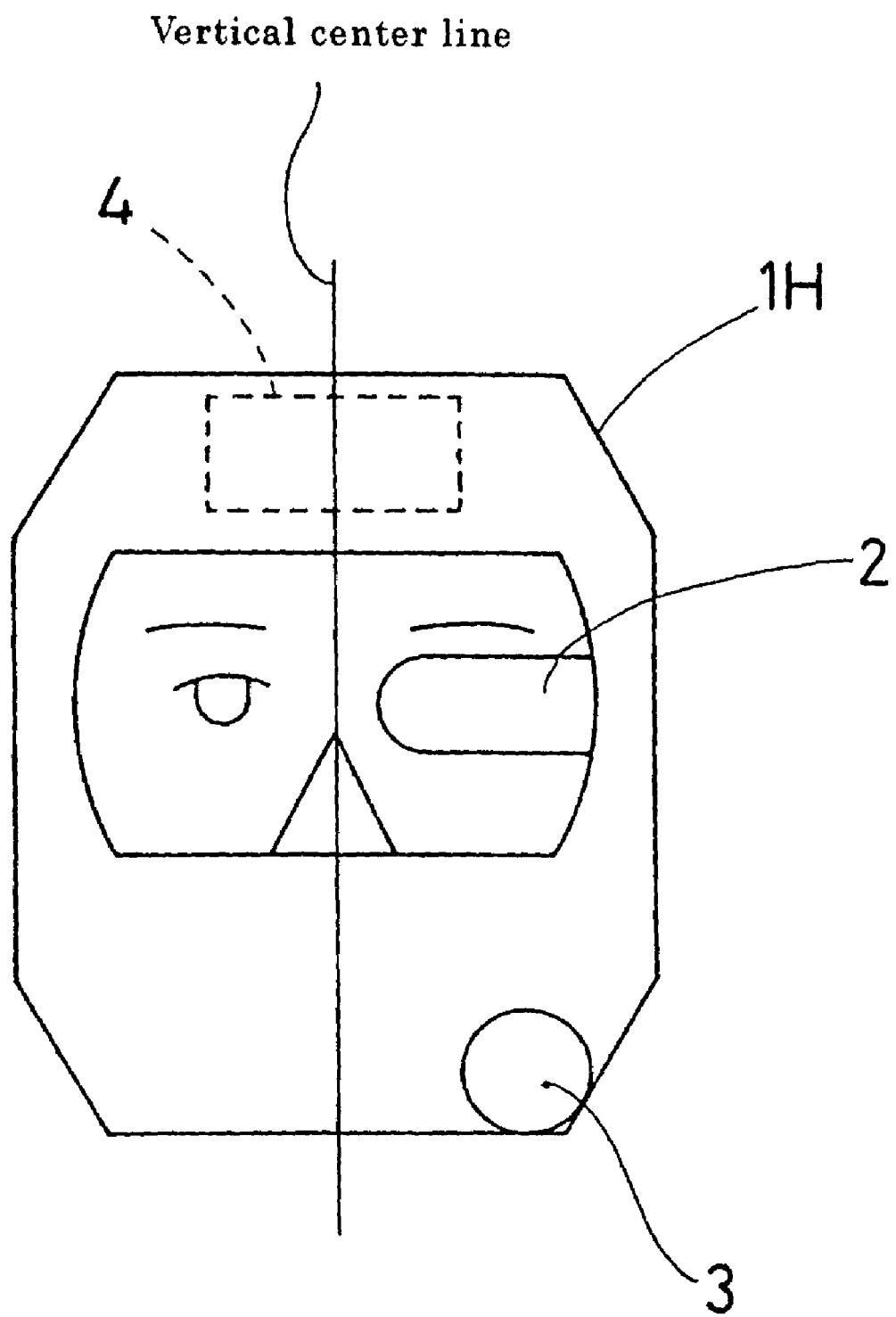
FIG. 10 illustrates the abnormality detection support device according to another embodiment of the present invention.

(7) As shown in FIG. 10, it is preferable that the infrared camera 3 and the display 2 are arranged on the same side with respect to the virtual center line which divides the front of the user's head into right and left portions. In this embodiment, a user can have a more factual distance perception and a more real sense of direction by adjusting the monocular display 2 to the direction the infrared camera 3 points to.

Figure 11:
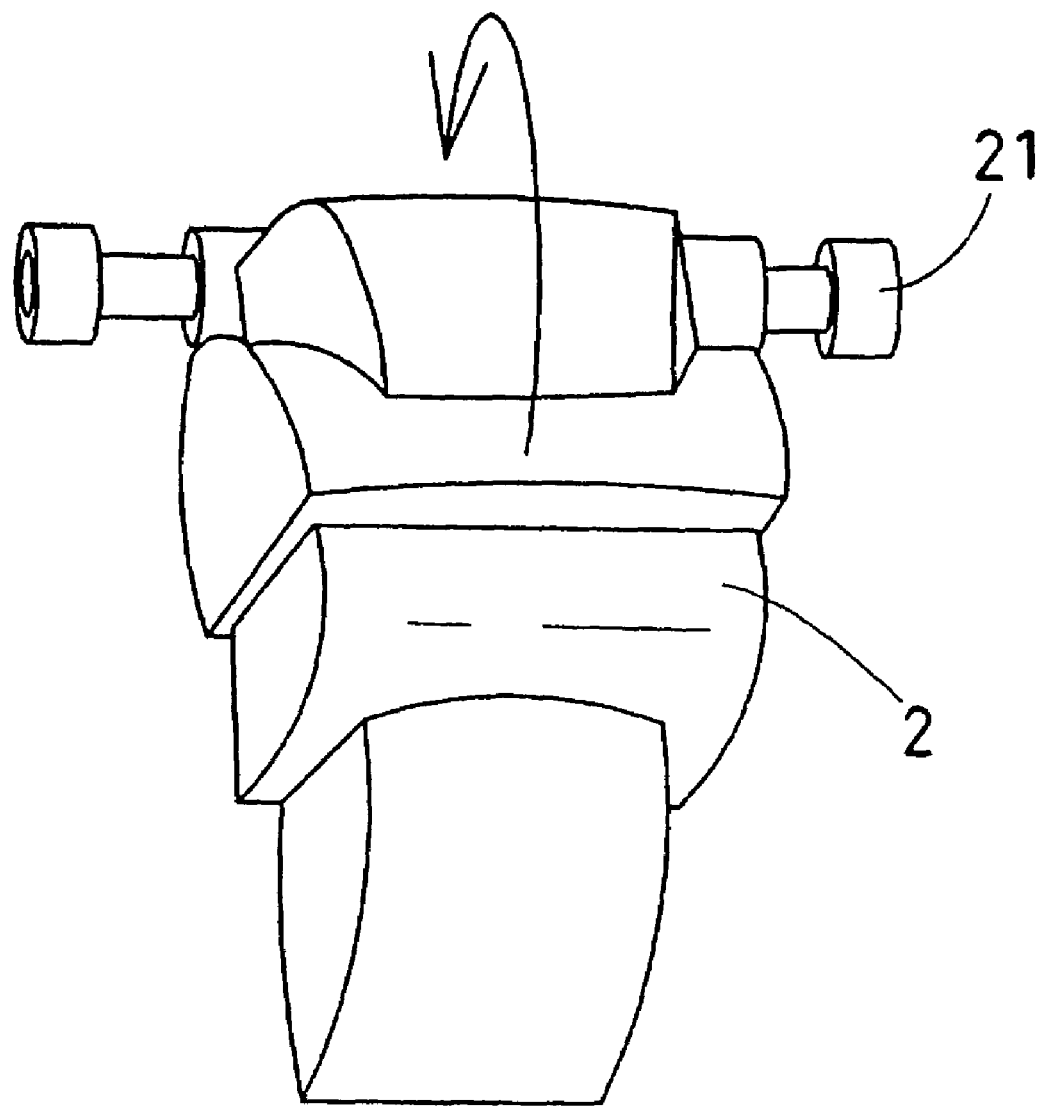
FIG. 11 is a perspective view of a mechanism for moving a display to another position.
Figure 12:
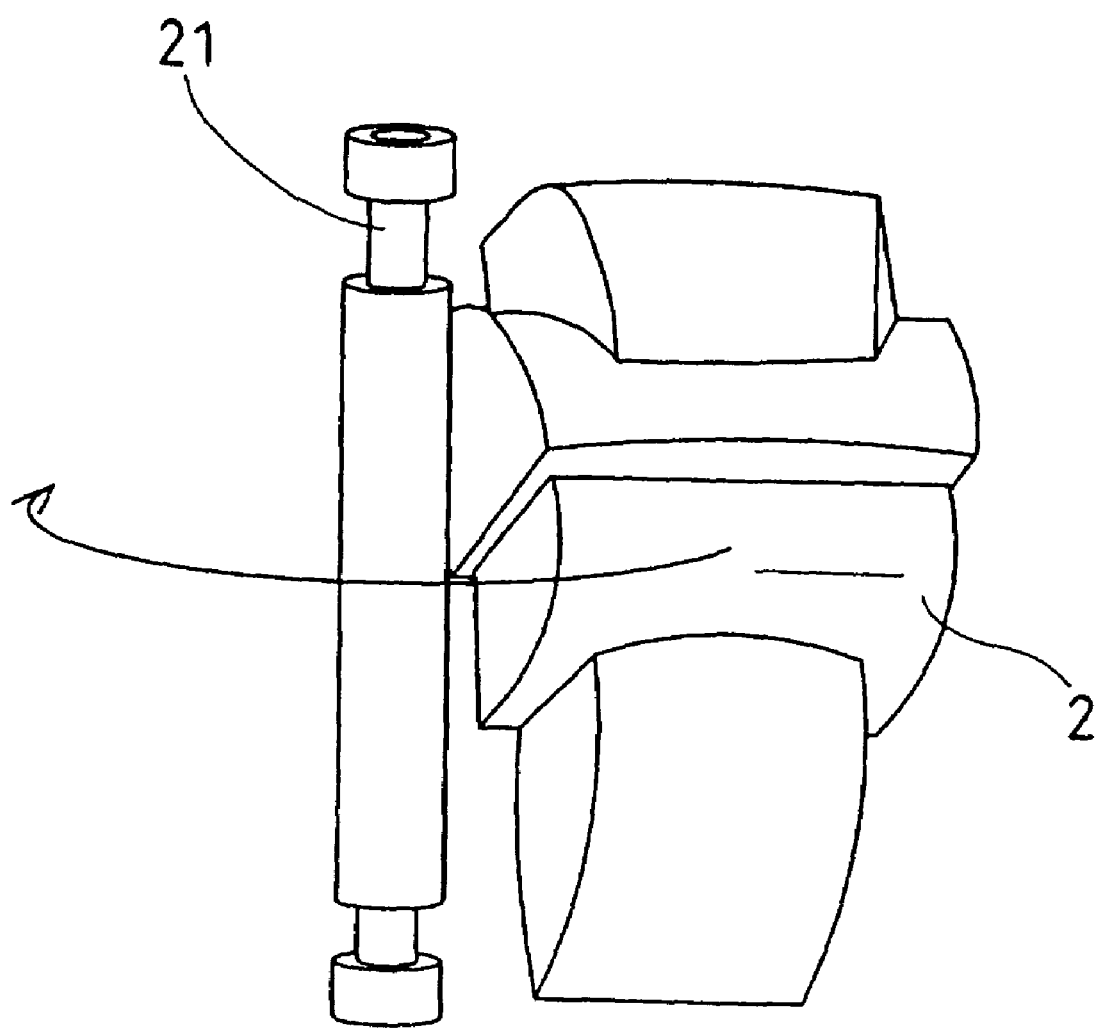
FIG. 12 is a perspective view of a mechanism for moving the display to another position.
Figure 13:
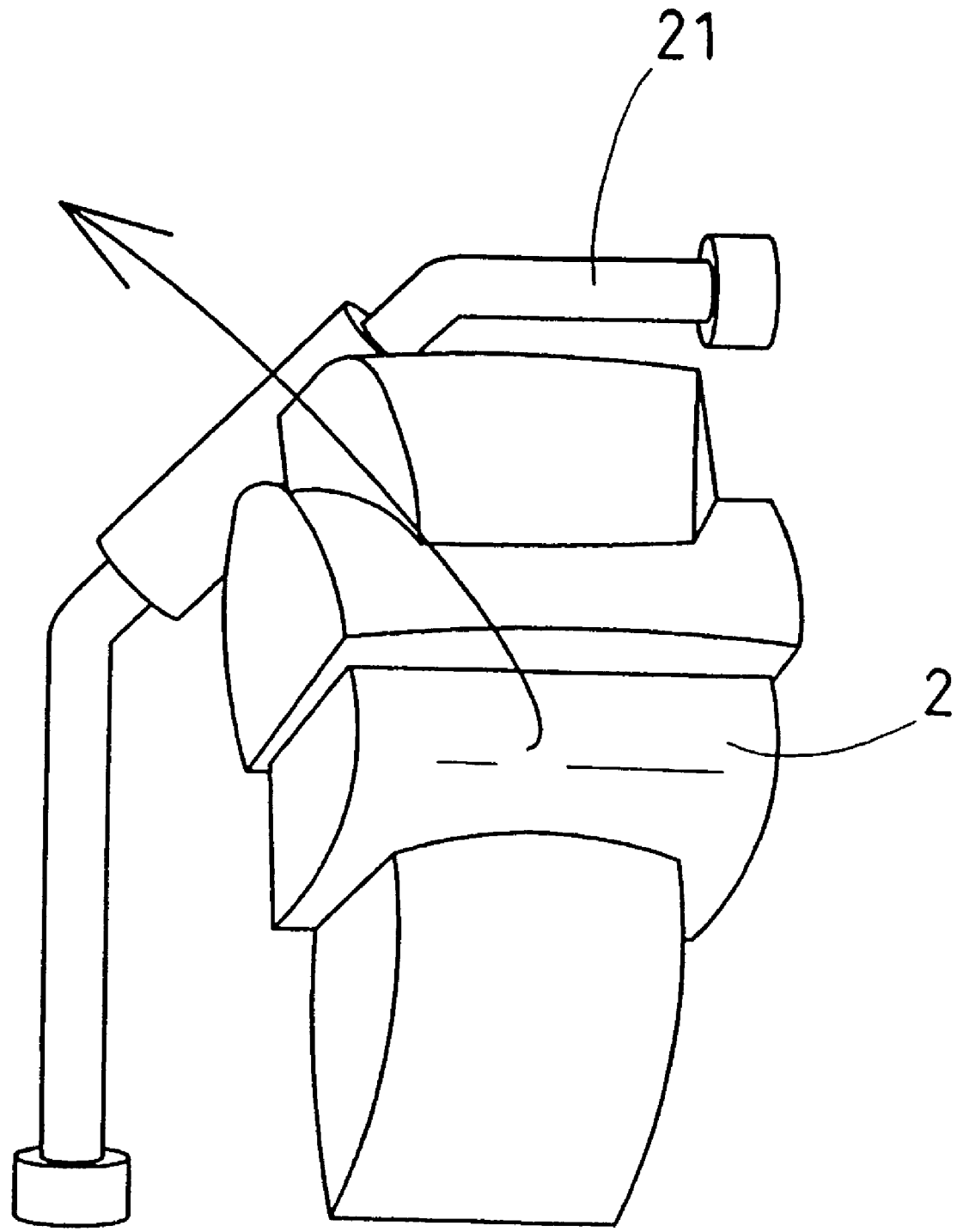
FIG. 13 is a perspective view of a mechanism for moving the display to another position.

(8) As shown in FIGS. 11 to 13, the display 2 is moved rotationally on the fixed axis 21 to another position so as to be out of the user's view when the display 2 is not in use. In this embodiment, since the display 2 can be moved to another position so as to be out of the user's view when the display 2 is not in use, the user can easily grasp the situation through both his/her eyes.

(9) It is preferable that the front surface of the helmet 1H is shielded by a transparent resin plate, and the inner surface of the plate and the surface of the display 2 are fog-proofed.

(10) In the above embodiment, the display 2 is of the monocular type, but may be of a binocular type.

(11) As the infrared camera 3, any one of a far-infrared camera, a mid-infrared camera, and a near-infrared camera may be used. The most suitable type of a camera may be selected depending on the details of the operations.

(12) As the display 2, any one of a nontransparent display, a see-through display, and a see-around display may be adopted.

(13) The radio data transmission device is not inevitably required, and can be added as the need arises.

(14) The radio data transmission device may be additionally provided with a function for displaying instruction information from a remote location on the display 2 and a function for receiving an instruction in an auditory manner.

(15) It is preferable that at least one of the camera control device, the radio data transmission device and the battery, and the infrared camera are arranged so that the center of gravity is put over the virtual center line of the face protector or the helmet. In this embodiment, the right and the left sides of the device are well balanced in weight, and thus strain on the user's neck is small.

(16) The structures explained in (1) to (15) are mainly described for the helmet 1H, but they can be employed for the face protector such as the goggle 1G and the fire face piece 1 as long as they can be embodied.

The present invention having the above-mentioned structures produces the following effects.

As is clear from the contents described in the preferred embodiments of the present invention, the present invention can provide the abnormality detection support device which enables an operator to work with both hands available while directly watching the infrared image even under a circumstance that smoke or the like due to occurrence of fire disturbs the field of vision of the operator, and has excellent usability.

What is claimed is:

1. An abnormality detection support device comprising:
   at infrared camera;
   a display which, at least when the infrared camera is in use; comes to be positioned in front of a user's eyes and reproduces an image taken by the infrared camera thereon; and
   one of a face protector and a helmet, on which the infrared camera and the display are provided; wherein
   the infrared camera and the display are arranged to be within an outline of the user's head in a front view when the device is put on the user; and
   a shield is provided to a front of any one of the face protector and the helmet, and inner surface of the shield and a surface of the display are fog-proofed.

2. An abnormality detection support device comprising:
   an infrared camera;
   a display which, at least when the infrared camera is in use, comes to be positioned in front of a user's eyes and reproduces an image taken by the infrared camera thereon; and
   one of a face protector and a helmet, on which the infrared camera and the display are provided; wherein
   the infrared camera is arranged on a line extending through the user's left and right eyes and near one of the eyes; and
   a shield is provided to a front of any one of the face protector and the helmet, and inner surface of the shield and a surface of the display are fog-proofed.

3. An abnormality detection support device comprising:
   an infrared camera;
   a display which, at least when the infrared camera is in use, comes to be positioned in front of a user's eyes and reproduces an image taken by the infrared camera thereon; and
   one of a face protector and a helmet, on which the infrared camera and the display are provided; wherein
   the infrared camera is arranged so that a center of gravity is put over a virtual center line of any one of the Rice protector and the helmet; and
   a shield is provided to a front of any one of the face protector and the helmet, and inner surface of the shield and a surface of the display are fog-proofed.

4. The abnormality detection support device according to claim 3, wherein:
   at least one of a camera control device, a radio data transmission device and a battery is provided to one of the face protector and the helmet and
   at least one of the camera control device, the radio data transmission device and the battery, and the infrared camera are arranged so that a center of gravity is put over the virtual center line of one of the face protector and the helmet.

5. An abnormality detection support device comprising:
   an infrared camera a display which, at least when the infrared camera is in use, comes to be positioned in front of a user's eyes and reproduces an image taken by the infrared camera thereon; and one of a face protector and a helmet, on which the infrared camera and the display are provided; wherein the infrared camera is arranged in a position near a jaw portion of the user and a shield is provided to a front of any one of the face protector and the helmet, and inner surface of the shield and a surface of the display are fog-proofed.

6. An abnormality detection support device comprising.

an infrared camera a display which, at least when the infrared camera is in use, comes to be positioned in front of a user's eyes and reproduces an image taken by the infrared camera thereon; and one of a face protector and a helmet, on which the infrared camera and the display are provided; wherein the infrared camera is arranged in a position separated from the display in a front view and the image taken by the infrared camera is reproduced on the display in a position in front of the user's eyes by optical or electrical coordinate conversion; and a shield is provided to a front of any one of the face protector and the helmet, and inner surface of the shield and a surface of the display are fog-proofed.

7. The abnormality detection support device according to any one of claim 1 to 6, the display is of a monocular type.

8. The abnormality detection support device according to claim 7, wherein the infrared camera and the display are arranged on a same side with respect to a virtual center line which divides a front of a head of the user into right and left portions.

9. The abnormality detection support device according to any one of claim 1 to 6, wherein one of the face protector and the helmet is equipped with a radio data transmission device for radio-transmitting an image signal of the infrared camera to a radio receiver provided in a remote location.

10. The abnormality detection support device according to any one of claim 1 to 6, wherein the infrared camera is detachable from one of the face protector and the helmet.

11. The abnormality detection support device according to claim 10, wherein the infrared camera can be attached to or detached from one of the face protector and the helmet with the user's simple operation.

12. The abnormality detection support device according to any one of claim 1 to 6, wherein the display can be moved to another position so as to be out of the user's view when the display is not in use.

13. The abnormality detection support device according to any one of claim 1 to 6, wherein an adjustment mechanism for adjusting a position and an angle of the display is provided.

14. An abnormality detection support device comprising:

an infrared camera a display which, at least when the infrared camera is in use, comes to be positioned in front of a user's eyes and reproduces a image taken by the infrared camera thereon; and one of a face protector and a helmet, on which the infrared camera and the display are provided; wherein the infrared camera and the display are arranged to be within an outline of the user's head in a front view when the device is put on the user;

one of the face protector and the helmet is equipped with a radio data transmission device for radio-transmitting an image signal of the infrared camera to a radio receiver provided in a remote location; and the infrared camera, the display and the radio data transmission device are installed inside one of the face protector and the helmet.

15. An abnormality detection support device comprising:

an infrared camera;

a display which, at least when the infrared camera is in use, comes to be positioned in front of a user's eyes and reproduces an image taken by the infrared camera thereon; and one of a face protector and a helmet, on which the infrared camera and the display are provided; wherein the infrared camera is arranged on a line extending through the user's left and light eyes and near one of the eyes; and one of the face protector and the helmet is equipped with a radio data transmission device for radio-transmitting an image signal of the infrared camera to a radio receiver provided in a remote location; and the infrared camera, the display and the radio data transmission device are installed inside one of the face protector and the helmet.

16. An abnormality detection support device comprising:

an infrared camera;

a display which, at least when the infrared camera is in use, comes to be positioned in front of a user's eyes and reproduces an image taken byte infrared camera thereon; and one of a face protector and a helmet, on which the infrared camera and the display are provided; wherein the infrared centers is arranged so that a center of gravity is put over a virtual center line of any one of the face protector and the helmet; and one of the face protector and the helmet is equipped with a radio data transmission device for radio-transmitting an image signal of the infrared camera to a radio receiver provided in a remote location; and the infrared camera, the display and the radio data transmission device are installed inside one of the face protector end the helmet.

17. An abnormality detection support device comprising:

an infrared camera;

a display which, at least when the infrared camera is in use, comes to be positioned in front of a user's eyes and reproduces an image taken by the infrared camera thereon; and one of a face protector and a helmet, on which the infrared camera and the display are provided; wherein the infrared camera is arranged in a position near a jaw portion of the user and one of the face protector and the helmet is equipped with a radio data transmission device for radio-transmitting an image signal of the infrared camera to a radio receiver provided in a remote location; and the infrared camera, the display and the radio data transmission device are installed inside one of the face protector and the helmet.

18. An abnormality detection support device comprising:

an infrared camera, a display which, at least when the infrared camera is in use, comes to be positioned in front of a user's eyes and reproduces an image taken by the infrared camera thereon; and one of a face protector and a helmet, on which the infrared camera and the display are provided; wherein the infrared camera is arranged in a position separated from the display in a front view and the image taken by the infrared camera is reproduced on the display in a position in front of the user's eyes by optical or electrical coordinate conversion; and one of the face protector and the helmet is equipped with a radio data transmission device for radio-transmitting an image signal of the infrared camera to a radio receiver provided in a remote location; and the infrared camera, the display and the radio data transmission device are installed inside one of the face protector and the helmet.

19. The abnormality detection support device according to any one of claims 14 and 15 through 18, wherein the radio data transmission device can receive radio data from a remote location.

* * * * *